(12) United States Patent
Gradl et al.

(10) Patent No.: US 6,381,269 B1
(45) Date of Patent: Apr. 30, 2002

(54) TEST SYSTEM WITH SIGNAL INJECTION NETWORK FOR CHARACTERIZING INTERFERENCE AND NOISE TOLERANCE IN A DIGITAL SIGNAL LINK

(75) Inventors: David A. Gradl, Naperville, IL (US); Michael L. Steinberger, Woodenville, WA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/322,827

(22) Filed: May 28, 1999

(51) Int. Cl.[7] .......................... H04B 3/46; H04B 17/00; H04Q 1/20
(52) U.S. Cl. ................... 375/224; 324/520; 324/521; 324/527; 714/715
(58) Field of Search ..................... 375/224, 227, 375/254, 285, 340; 714/46, 48, 712, 714, 715, 724, 738, 739; 324/512, 520, 521, 527, 528, 674, 681, 603, 628, 722

(56) References Cited

U.S. PATENT DOCUMENTS 5,063,351 A * 11/1991 Goldthorp et al.
5,517,522 A * 5/1996 Arweiler et al. ............. 375/224
5,541,521 A * 7/1996 North et al. ................. 324/628
6,188,227 B1 * 2/2001 Yuzwalk et al. ............. 324/628

* cited by examiner

*Primary Examiner*—Jean Corrielus
(74) *Attorney, Agent, or Firm*—Walter W. Duft

(57) ABSTRACT

A test system for a evaluating a digital signal link includes a data signal generator, a data signal receiver, a digital signal link to be tested and a test interference signal injection (TISI) network connected as part of the digital signal link. The TISI network includes a data signal input port for receiving digital data signals generated by the data signal generator, a data signal output port for providing the digital data signals to the data signal receiver, and a controlled impedance data signal path carrying the digital data signals between the data signal input port and the data signal output port. An interference signal input port receives interference signals over a range of frequencies from an interference signal generator. One or more directional couplers directionally couple the interference signals into the data signal path toward either the data signal output port or the data signal input port at an impedance that substantially matches the impedance of the digital signal link. The directional couplers are configured to maintain d.c. isolation from ground to facilitate the transfer of d.c. coupled data signal logic through the TISI network.

20 Claims, 13 Drawing Sheets

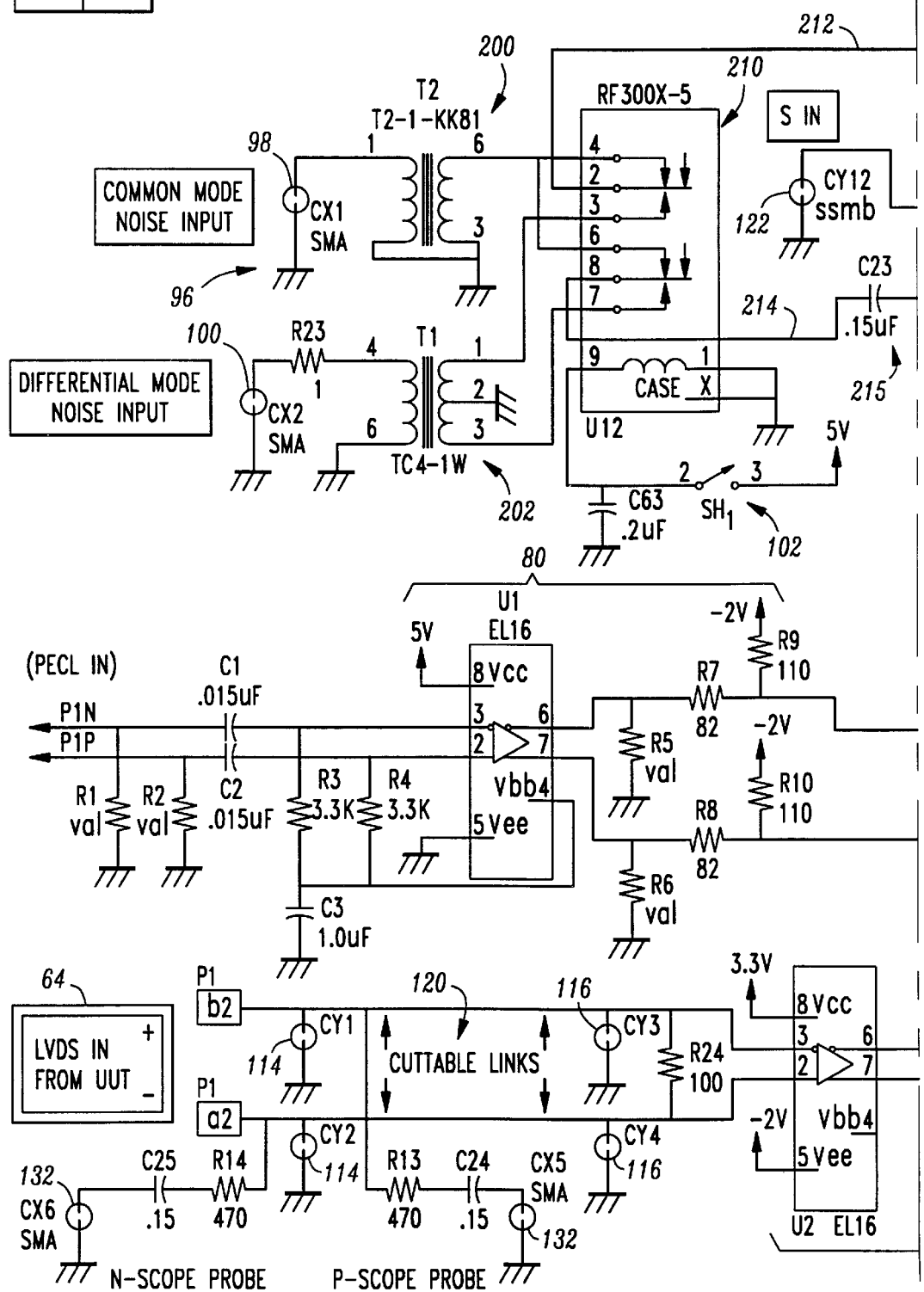

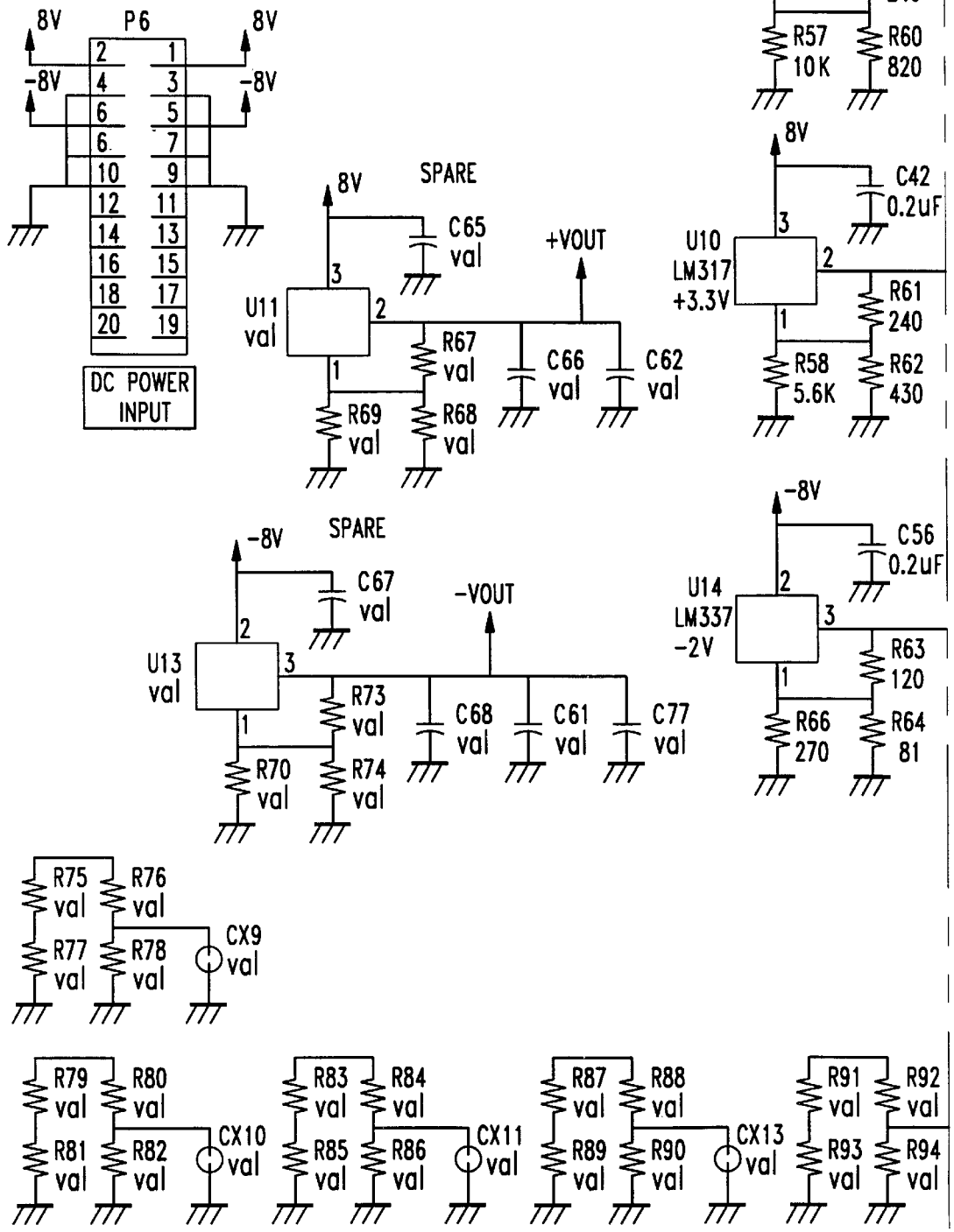

TEST SYSTEM WITH SIGNAL INJECTION NETWORK FOR CHARACTERIZING INTERFERENCE AND NOISE TOLERANCE IN A DIGITAL SIGNAL LINK

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to interference tolerance testing and characterization in a digital signal link. More particularly, the invention concerns a circuit network for injecting test interference signals into a digital signal link for evaluation of the tolerance of the link to extraneous interference and noise. The digital signal link may be a digital circuit, a connection between digital circuits, or any other serial (or parallel) data path.

2. Description of the Prior Art

The tolerance of a digital signal link to interference and noise is often difficult to measure. A major part of the problem is how to inject test interference signals into the link in a precise and controlled manner, without disrupting the normal signal path characteristics. The need for a broad frequency test range adds to the difficulty. Moreover, methods are needed for testing digital signal links carrying either common mode and differential mode signals.

Benefits of characterizing digital signal link interference and noise tolerance include the ability to design more reliable and robust equipment, and the avoidance of system level problems related to cross-talk and electromagnetic (EM) susceptibility. These are often found during late stages of system integration when they are very difficult and expensive to remedy.

Prior art characterizations of digital signal link interference and noise tolerance have been performed qualitatively based on an all-or-nothing, "go/no-go" approach. With these methods, the design margin of the tested link based on its tolerance to extraneous interfering signals is not provided.

A system that allows quantitative (as well as qualitative) measurement of the tolerance of a digital signal link to extraneous signals originating from within the equipment (cross-talk) or which inadvertently couples into the data signal path from outside the equipment, i.e., electromagnetic coupling (EMC), would be desirable. What is required is a test system that inserts interference test signals unobtrusively into the digital signal link to be evaluated, preferably over a broad frequency range, so that the response of the digital signal link to the applied interference may be observed.

SUMMARY OF THE INVENTION

A solution to the foregoing problem is provided by a test system that facilitates the efficient characterization of interference and noise tolerance in a digital signal link. Testing may be performed on the elements of any high speed serial (or parallel) data path, including the line driver, the interconnection path elements such as printed wiring board (PWB) traces, vias, connectors and signal cables, and the line receiver. Testing is performed using only passive (linear) components that allow the injection of controlled amounts of an impedance-matched interference signal into the digital signal link with minimal disruption of the normal digital signal path characteristics.

In a first preferred embodiment of the invention, the test system includes a digital data signal generator, a digital data signal receiver, a digital signal link to be tested, and a test interference signal injection (TISI) network connected as part of the digital signal link. The TISI network includes a data signal input port for receiving digital data signals generated by the data signal generator, a data signal output port for providing digital data signals to the data signal receiver, and a controlled-impedance data signal path carrying digital data signals between the data signal input port and the data signal output port. An interference signal input port in the TISI network receives interference signals over a range of frequencies from an interference signal generator. One or more directional couplers within the TISI network directionally couple the interference signals in a controlled fashion into the data signal path, toward either the data signal output or input port, at an impedance that substantially matches the impedance of the digital signal link.

The directional couplers are preferably broadband microwave directional coupling transformers with several decades of bandwidth. Advantageously, the TISI network is configured so that the directional couplers transfer d.c. voltage levels present in the digital data signals through the TISI network while blocking the d.c. voltage levels present in the interference signals. More specifically, the directional coupler ground pins are preferably connected to a plurality of parallel-connected bypass capacitors to provide a floating node that acts as an a.c. ground, thus allowing the d.c. voltage levels of the digital data signals to pass unimpeded through the directional couplers to the data signal output port. A series capacitor is provided at the directional coupler pins receiving the interference signals to block the d.c. levels therein.

The digital signal link may carry either common mode or differential mode digital data signals. There are preferably two directional coupling transformers provided in the TISI network. When common mode interference is to be coupled into the data signal path, common mode interference signals having the same phase and amplitude are applied to both of the coupling transformers. When differential mode interference is to be coupled into the data path, differential mode interference signals having the same amplitude but a 180 degree phase differential are applied to the directional couplers. A phase splitter circuit within the TISI network receives the interference signals from the interference signal input port and selectively provides the common mode interference signals and the differential mode interference signals to the directional couplers. The phase splitter preferably includes a pair of impedance matching transformers, one of which is a non-phase splitting transformer having a grounded end terminal for providing the common mode interference signals, and the other being a phase splitting transformer having a grounded center-tap terminal for providing the differential mode interference signals. A switch-activated radio frequency relay is employed to selectively apply the common mode interference signals and the differential mode interference signals from the impedance matching transformers to the directional coupling transformers.

The digital data signal generator and receiver can be implemented as a bit error rate (BER) generator and a BER receiver, respectively, in order to measure bit error rates as a function of the frequency and signal strength of the applied interference. In addition, one or more monitoring ports can be provided in the test system for connecting signal monitoring equipment at one or more locations in the digital signal link under test to sample digital data signals carried therein. By way of example, a sampling oscilloscope could be connected to a monitoring port in order to observe changes in the digital waveforms as interference is applied.

In a second preferred embodiment of the invention, the data signal generator and the data signal receiver are part of a signal generating and analysis suite. The signal generating and analysis suite communicates with a test board that in turn communicates with a circuit unit under test (UUT). The test board mounts the driver end components of an outbound digital signal link that extends from the test board to the receiver end of the UUT. The test board also mounts the receiver end components of an inbound digital signal link that extends to the test board from the driver end of the UUT. The outbound and inbound digital signal links include appropriate signal carrying media, such as cabling, extending between the test board and the UUT. During interference and noise tolerance testing, the UUT is operated in a loop back mode such that digital test signals carried from the test board to the UUT on the outbound digital signal link are immediately returned from the UUT to the test board on the inbound digital signal link. In this way, useful information can be determined about the driver and receiver ends of the UUT and the digital signal carrying connections thereto.

In a first aspect of the second embodiment, a TISI network is mounted on the test board and adapted to be incorporated into either the outbound digital signal link or the inbound digital signal link. In a second aspect of the second embodiment, the TISI network is mounted on the test board and adapted to be selectively connected to either the outbound digital signal link or the inbound digital signal link. As data signals are driven on the digital signal links, the TISI network is activated to inject varying levels and types of interference into the data signal path.

In the second preferred embodiment, the data signal generator and receiver might respectively include a pattern generator circuit and a logic analyzer circuit, each implementing transistor-transistor logic (TTL) carried on parallel data paths. To convert this parallel data to the serial data format carried on the digital signal link, additional circuit components, including a pattern generator clock circuit, a serial-to-parallel conversion circuit, and a parallel-to-serial signal conversion circuit, may be incorporated on the test board. A clock recovery circuit may also be provided for deriving clock signals from the serial data signals received at the digital signal link receiver. If the digital signal links carry low voltage differential signals (LVDS), the test board may also include PECL-to-LVDS and LVDS-to-PECL signal translation circuits. As in the case of the first preferred embodiment, one or more monitoring ports can be provided in the digital signal links for connecting signal monitoring equipment. Preferably, one pair of monitoring ports is provided between the driver end of the outbound digital signal link and the receiver end of the UUT, and another pair of monitoring ports is provided between the driver end of the UUT and the receiver end of the inbound digital signal link.

BRIEF DESCRIPTION OF THE DRAWING

The foregoing and other features and advantages of the invention will be apparent from the following more particular description of a preferred embodiment of the invention, as illustrated in the accompanying Drawing, in which.

DETAILED DESCRIPTION OF THE PREFERRED EMBODIMENT

Figure 1:
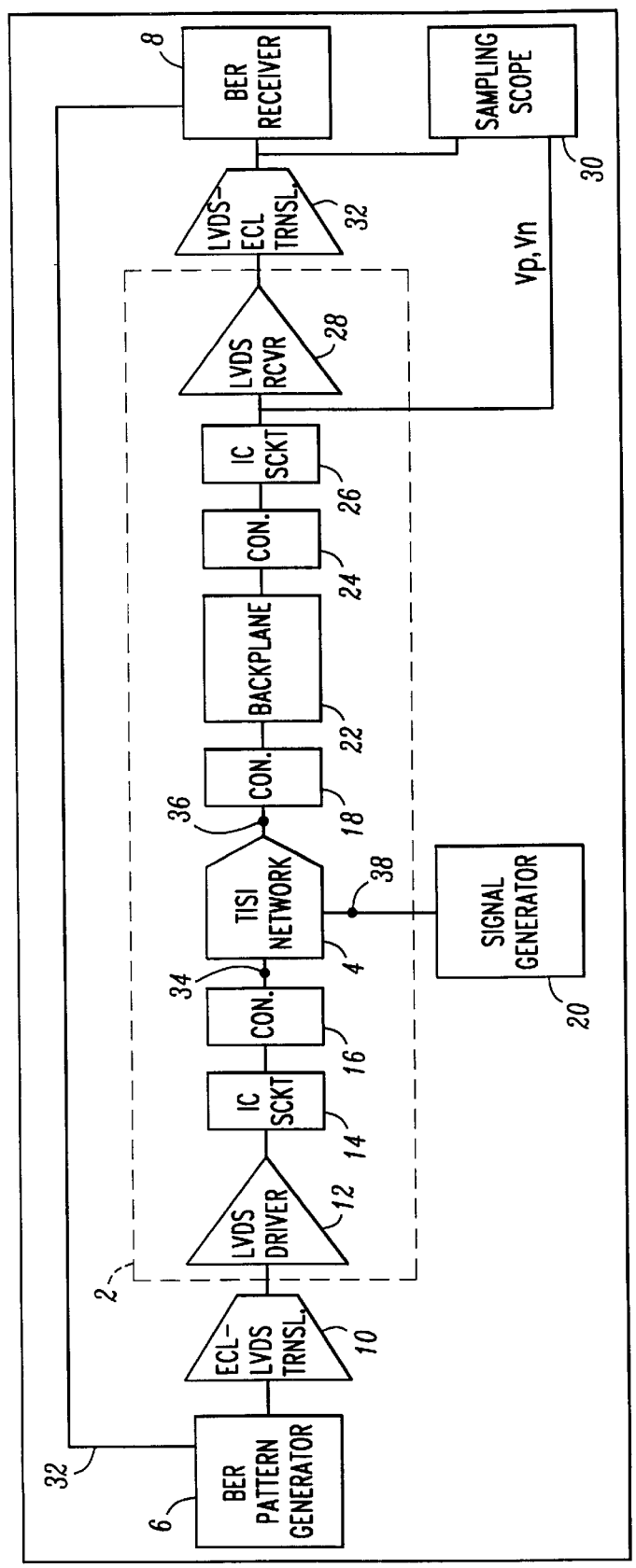
FIG. 1 is a block diagram showing a test system including a digital signal link and a TISI network incorporated therein in accordance with a first preferred embodiment of the present invention.

Turning now to the figures, wherein like reference numerals represent like elements in all of the several views, FIG. 1 illustrates a test system 1 for testing a digital signal link 2 for interference tolerance. A test interference signal injection (TISI) network 4 is connected as part of the digital signal link 2 in order to introduce interference signals therein. The digital signal link 2 is configured, by way of example only, as a low voltage digital signal (LVDS) serial data link operating at a data transfer rate of 622 Mbps to simulate high speed asynchronous transfer mode (ATM) or synchronous optical network (SONET) transmissions, or communications based on any other applicable protocol. The digital signal link 2 is connected in the test system 1 to receive a pseudo random bit pattern data signal from a bit error rate (BER) pattern generator 6 and to carry that signal to a BER receiver 8. By way of example only, a model HP70841B™ BER pattern generator could be used to implement the BER pattern generator 6 and a model HP70842B™ BER receiver could be used to implement the BER receiver 8. The pattern generator 6 in the embodiment of FIG. 1 produces emitter coupled logic (ECL) voltage level data signals. These ECL logic levels are translated to LVDS levels by an ECL-LVDS translation buffer 10, and fed to an LVDS driver 12 that amplifies the LVDS data signals and matches the output impedance to a standard line impedance of 50 ohms. The LVDS data signals are passed through an integrated circuit (IC) socket 14 to a first connector 16 which, by way of example only, could be a METRAL™ brand 5×6 pin header-receptacle pair.

The TISI network 4 is placed in the digital signal link 2 between the first connector 16 and a second connector 18 of identical construction. The TISI network 4 receives interference signals generated by an interference signal generator 20 which, by way of example only, could be implemented with a model HP8648C™ signal generator 20. The TISI network 4 is constructed with broadband directional coupler components (see description below of element 90 of FIGS. 3–7 for additional details) and is configurable to selectively couple differential mode and common-mode interference signals into the digital signal link 2, in either direction.

Still within the digital signal link 2, the second connector pair 18 is connected to a backplane 22 of the type that is commonly used for interconnecting high speed digital transmission signals. The backplane 22 is connected through a third (e.g. METRAL™) connector pair 24 to an IC socket 26. The IC socket 26 feeds the LVDS data signal to an LVDS receiver 28 that amplifies the data signal and provides appropriate impedance matching. The data signal is monitored between the IC socket 26 and the LVDS receiver 28 with a sampling oscilloscope 30. An electrical connection, not normally a part of the digital signal link 2, feeds the positive and negative data signal components Vp and Vn, respectively, thereto. The oscilloscope 30, by way of example only, could be a model CSA803A™ digital sampling oscilloscope. An LVDS-ECL translation buffer 32 converts the LVDS data signal back to ECL logic levels and provides the ECL data signal to the BER receiver 8. The ECL data signal is also provided to the sampling oscilloscope 30.

The TISI network 4 receives digital data signals from the pattern generator 6 at a (dual line) data signal input port 34. A controlled impedance data signal path within the TISI network 4 connects the data signal input port 34 to a (dual line) data signal output port 36 in the TISI network 4 that returns the digital data signals to the digital signal link for transmittal to the BER receiver 8. An interference signal input port 38 in the TISI network 4 receives the interference signals from the signal generator 20.

As stated, the TISI network 4 is configured to couple either common mode or differential mode interference signals into the digital signal link 2, either toward the driver 12 or toward the receiver 28. As interference signals are applied using different frequencies, amplitudes and directions, the signal patterns on the sampling oscilloscope 30 may be observed to qualitatively measure the effects of the interference on the data signal. In addition, bit error measurements can be taken by comparing the received data signal with the generated data signal, which is provided directly to the BER receiver 8 from the BER pattern generator 6 through the data signal path 32.

During differential mode interference testing, the level of the interference signal that can be added before bit errors occur is an indication of data link robustness or operating margin. This measurement indicates the electrical integrity of the digital signal link 2, including the signal path. As transmission line reflections, loss and other noise components occur in the signal path, the amount of injected interference the link can tolerate will decrease. Driver and receiver defects will likewise cause such a decrease.

During common mode interference testing, a common mode interference signal is coupled into the LVDS data signal. This interference signal corresponds to the commonly occurring type of radiated noise interference that is seen in hardware systems. The level of common mode interference signal that can be added before bit errors occur is an indication of the ability of the digital signal link to withstand common mode noise present at the input of the LVDS receiver 28. This common mode noise can overload the receiver or convert to differential mode noise that corrupts the LVDS data signal directly. The LVDS receiver 28 is the main element in the digital signal link that determines common mode noise immunity, but not the only element. It has been determined that differential signal path imbalance can cause common mode noise conversion as well. Imbalance in the LVDS driver 12 can also cause noise conversion. The common mode interference signal injection test described above is more comprehensive than a conventional receiver common mode rejection test and is more precise insofar as specific bit error rate criteria can be used.

Figure 2:
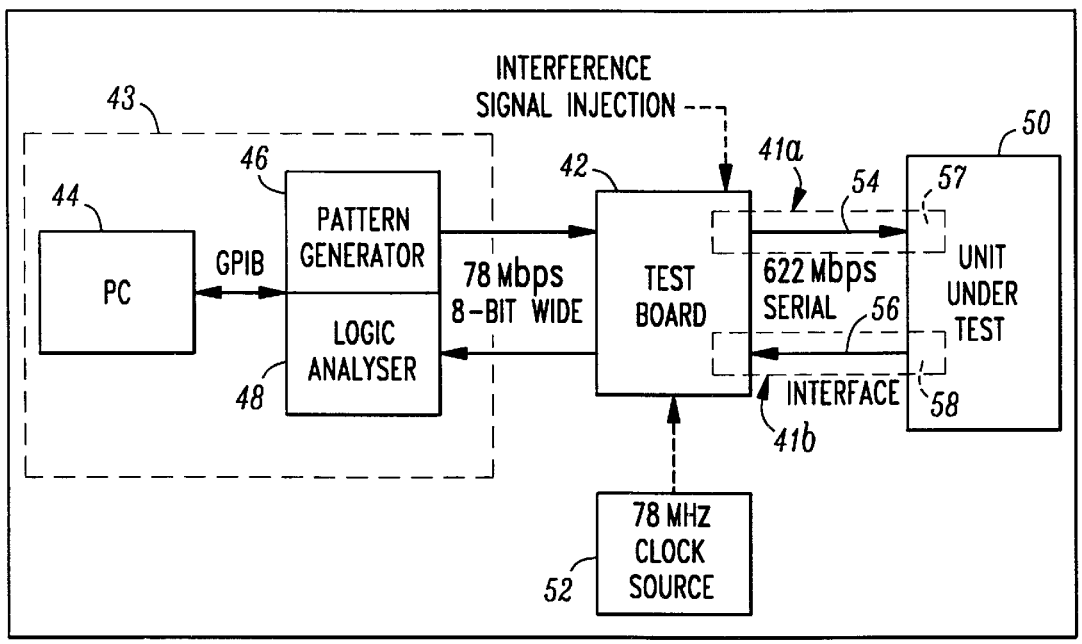
FIG. 2 is a block diagram showing a test system that includes a test board having digital signal link components and a TISI network mounted thereon in accordance with a second preferred embodiment of the present invention.

Turning now to FIG. 2, a test system 40 is illustrated for testing a system with two digital signal links 41a and 41b providing communication in opposing directions within a closed-loop test environment. The digital signal links 41a and 41b are incorporated, in part, on a test board 42 along with additional circuitry that allows the digital signal links to operate under the control of a signal generating and analysis suite 43.

The signal generating and analysis suite 43 includes a programmed digital computer 44, which could be a personal computer (PC) or the like, that controls a pattern generator 46 and a logic analyzer 48 which, by way of example only, could be an HP16500™ series pattern generator/logic analyzer or the like. The pattern generator 46 and the logic analyzer 48 generate and analyze digital data signals, respectively, that are sent to and received from a digital circuit 50, representing a unit under test (UUT). As described in more detail below, the test board 42 further mounts a TISI network (90) that selectively injects interference signals provided by an interference signal generator 52 into the digital signal links 41a and 41b, one of which is outbound from the test board 42 to the UUT 50 and other of which is inbound from the UUT 50 to the test board 42.

The outbound and inbound digital signal links 41a and 41b are implemented in the embodiment of FIG. 2 as high speed serial data link carrying 622 Mbps LVDS serial data signals to simulate inter-IC and inter-PWB communications based on ATM, SONET or any other applicable protocol. The outbound digital signal link 41a extends from the test board 42 to the UUT 50 along a high speed serial communication link segment 54. The inbound digital signal link 41b extends from the UUT 50 to the test board 42 along a link segment 56. The link segments 54 and 56 respectively connect to receiver end and driver end circuits 57 and 58 in the UUT 50. The link segments 54 and 56 could be implemented using any suitable data transmission media, such as shielded cabling (using two cables per segment) or the like. The UUT 50 itself could be any digital signal processing unit having respective receive-side and transmit-side components 57 and 58. In addition, as described in more detail below, the UUT 50 typically have a loop-back mode that allows digital signals input to the receiver end 57 to be returned via the driver end 58 while bypassing the normal signal processing components of the UUT 50.

The PC 44 connects to the pattern generator 46 and the logic analyzer 48 via a general parallel interface bus (GPIB) of conventional design. The pattern generator 46 and the logic analyzer 48 connect to the test board 42 via parallel data paths that transfer parallel data signals at transistor-transistor-logic (TTL) voltage levels at a rate of 77.76 Mbps, representing one-eighth the data rate of the 622 Mbps serial data signals carried on the digital signal link 41.

Figure 3:
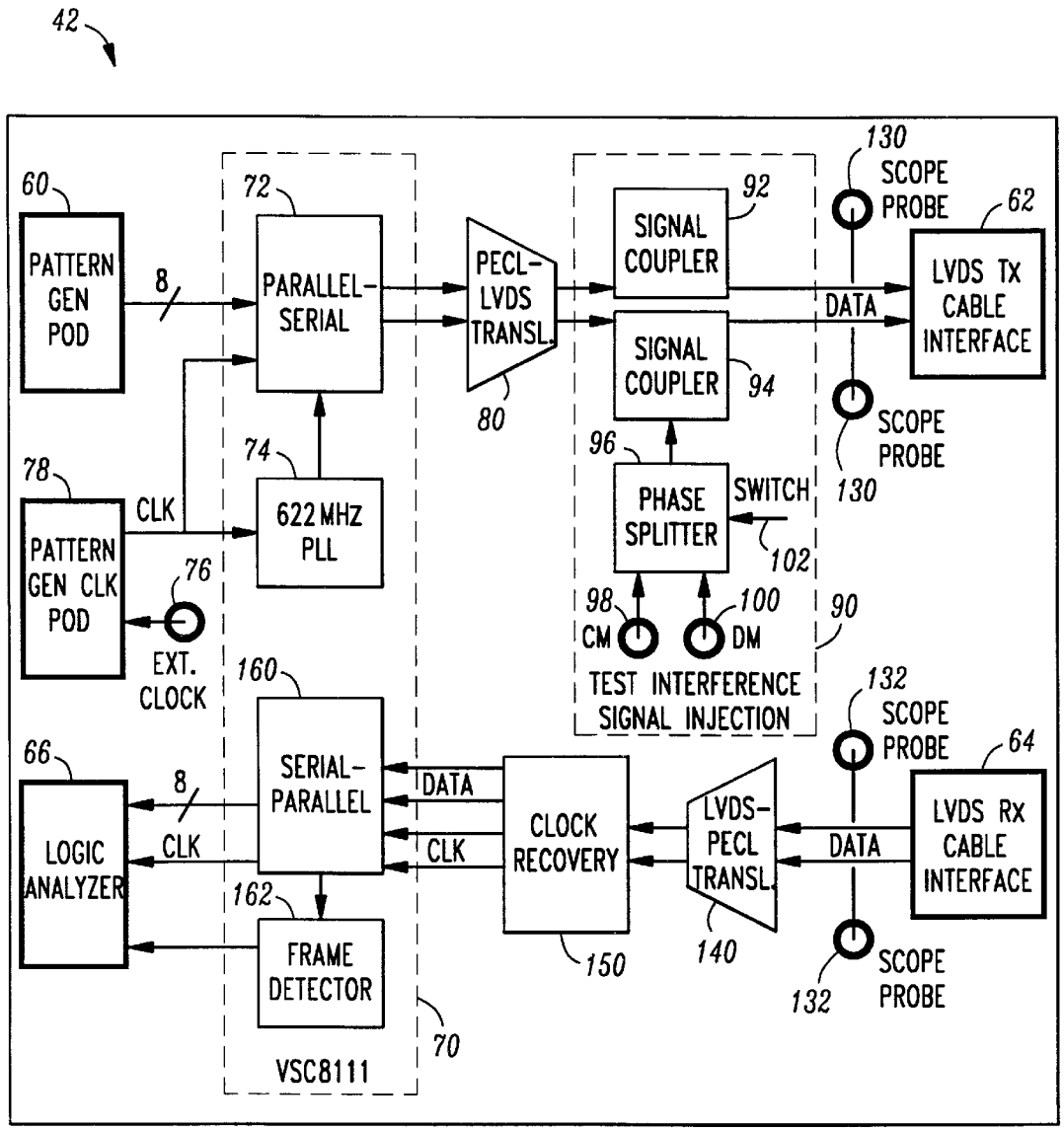
FIG. 3 is a block diagram showing the test board of FIG. 2 with the TISI network configured for injecting interference signals into an outbound digital signal link.
Figure 4:
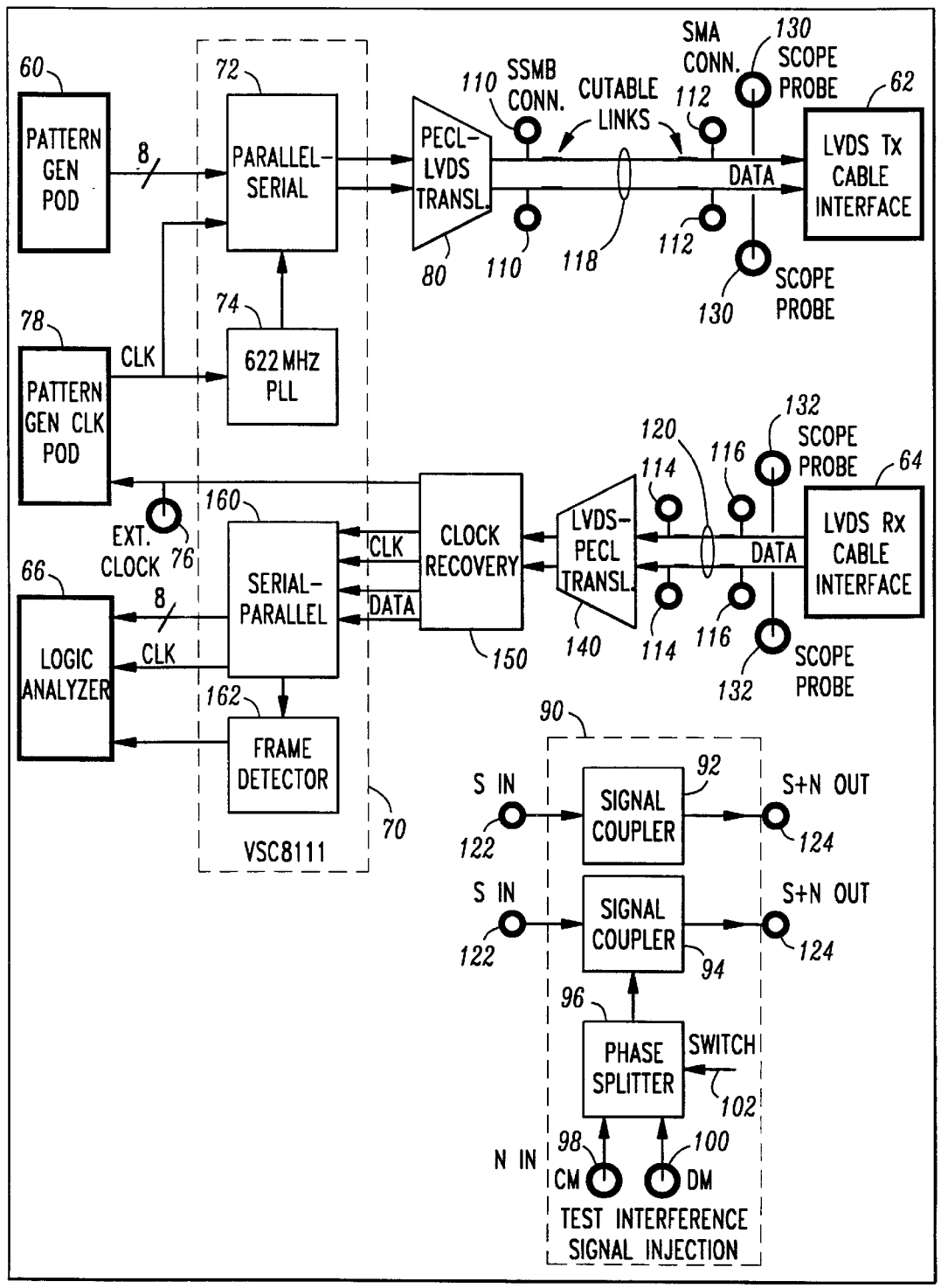
FIG. 4 is a block diagram showing the test board of FIG. 2 with the TISI network configured for injecting interference signals into either an outbound digital signal link or an inbound digital signal link.

As shown in FIGS. 3 and 4, and as explained in more detail below, the test board 42 contains multiplexer/ demultiplexer circuits, LVDS/PECL translators and clock recovery circuits that provide an interface for transforming the TTL parallel data signals carried by the pattern generator 46 and the logic analyzer 48 to the high speed LVDS serial data signals carried by the digital signal links 41a and 41b, and visa versa.

FIGS. 3 and 4 further illustrate two alternative configurations of the test board 42 that are identical in all respects except for the locations at which interference signals are applied to the digital signal links. In the configuration of FIG. 3, the interference signals are connected to the outbound digital signal link 41a at a location which is upstream from the link segment 54. In the configuration of FIG. 4, the interference signals can be selectively connected to either the outbound digital signal link 41a or the inbound digital signal link 41b at a location which is downstream from the link segment 56.

In both configurations, the test board 42 is designed to translate the 77.76 Mbps, TTL level, parallel data signals processed by the pattern generator 46 and the logic analyzer 48 into the 622 Mbps, LVDS level, serial data signals processed by the UUT 50. An eight bit parallel connector 60 receives the 77.76 Mbps parallel data signals generated by the pattern generator 46. A high speed serial connector 62 provides the 622 Mbps serial data signals to the link segment 54, for transmission to the UUT 50. A high speed serial connector 64 receives the 622 Mbps serial data signals returned from the UUT 50 via the link segment 56. An eight bit parallel connector 66 provides the 77.76 Mbps parallel data signals to the logic analyzer 48.

The parallel data signals generated by the pattern generator 46 and provided to the test board 42 at the parallel connector 60, are passed to a multiplexer/demultiplexer (Mux/Demux) circuit 70 that converts the parallel data signals into 622 Mbps serial data signals. The Mux/Demux circuit 70 is conventional in design and may be implemented, by way of example only, using a VITESSE™ model VSC8111 integrated circuit (IC). The Mux/Demux circuit 70 includes a parallel-serial (PS) conversion circuit 72 and a 622 MHz phase lock loop (PLL) clock multiply circuit 74.

Clocking of the data signals bound for the UUT 50 may be provided in two ways. As shown in FIG. 3, the pattern generator 60 can be operated in an external clock mode in which a system clock signal of 77.76 MHz is provided by the UUT 50 and introduced into the TISI network 42 via an external clock port 76. This clock signal is fed from the clock port 76 to the pattern generator 46 via a pattern generator clock connector 78 and returned via the same connector 78 to latch data signals into the parallel side of the PS circuit 72. The same clock signal is also fed to the 622 MHz PLL clock multiplier circuit 74 and multiplied by eight to drive the serial side of the PS conversion circuit 72. As shown in FIG. 4, if a 77.76 MHz clock signal is not available from the UUT 50, an alternative clock mode may be used wherein the clock signal recovered from the digital signal link receive side is used to generate the clocks for the transmit side data signals.

The driver end of the outbound digital signal link 41a is provided by a differential PECL-LVDS translation circuit 80. Its input is a.c. coupled to the output of the PS conversion circuit 72. The PECL-LVDS translation circuit 80 is conventional in nature and may be implemented, by way of example only, using a MOTOROLA™ model 10EL16D ECL line receiver IC combined with a resistive voltage divider network (see FIGS. 5 and 6) to amplify and level shift the PECL data signals to LVDS levels. The output impedance of the PECL-LVDS translation circuit 80 is designed to match the line impedance (e.g., 50 ohms) of the shielded cabling forming each of the link segments 54 and 56.

In the test system configuration of FIG. 3, the LVDS data signals driven onto the outbound digital signal link 41a by the PECL-LVDS translation circuit 80 are passed to the (dual line) data signal input port of the TISI network 90. These data signals travel the TISI network's internal data signal path and are returned to the outbound digital signal link 41a through the (dual line) data signal output port of the TISI network 90. As described in more detail below, the TISI network contains two directional couplers 92 and 94, a phase splitter circuit 96, a pair of interference signal input ports 98 and 100 representing a common mode interference signal port and a differential mode interference signal port, respectively, and a mode selection toggle switch 102 controlling a radio frequency (RF) relay 210 (see FIGS. 5 and 6). These same components could be used to implement the TISI network 4 of FIG. 1.

The directional couplers 92 and 94 provide a high quality, impedance matched (e.g., 50 ohm) data signal path for the positive and negative components of the LVDS data signals while adding precise levels of interference signals thereto. By controlling the phase of the interference signals applied to one directional coupler 92 or 94 with respect to the other, pure common mode or differential mode signal injection can be achieved.

The interference signal ports 98 and 100 connect to common mode and differential mode interference signal sources (not shown). The phase splitter circuit 96 provides appropriate impedance matching and selectively applies pairs of interference signals, each having a selected phase relative to the other, to the directional couplers 92 and 94. The toggle switch 102 controls the RF relay 210 within the phase splitter circuit 96 to make the desired connections.

In the test system configuration of FIG. 4, the TISI network 90 can be selectively connected to either the outbound digital signal link 41a or the inbound digital signal link 41b. A connector pair set 110/112 in the outbound digital signal link 41a and a connector pair set 114/116 in the inbound digital signal link 41b are provided to facilitate this selective placement of the TISI network 90. Cutable links 118 and 120 are provided in the outbound and inbound digital signal links 41a and 41b, and can be removed to allow connection of the TISI network 90. The TISI network 90 itself includes pairs of signal–only (S) input connectors 122 and signal+noise (S+N) output connectors 124. To place the TISI network 90 in the outbound digital signal link 41a, the S connector pair 122 is attached to the connector pair 110 (or 112), the S+N connector pair 124 is attached to the connector pair 112 (or 110), and the cutable link 118 is removed. To place the TISI network 90 in the inbound digital signal link 41b, the S connector pair 122 is attached to the connector pair 116 (or 114), the S+N connector pair 124 is attached to the connector pair 114 (or 112), and the cutable link 120 is removed.

Scope probe ports 130 may be further provided on the outbound digital signal link 41a, e.g., adjacent to the serial connector 62, to facilitate qualitative measurement of the LVDS data signals after interference signals are injected by the TISI network 90. Similar scope probe ports 132 are provided on the inbound digital signal link 41b to measure the LVDS data signals returning from the UUT 50 through the serial connector 64.

The serial connectors 62 and 64 are preferably formed as a single connector, such as a METRAL™ 5×6 pin header, that receives a corresponding METRAL™ 5×6 socket receptacle attached to the shielded pair cables that form the link segments 54 and 56. The outbound and inbound LVDS data signals are preferably connected on the same pin row with center ground pins separating the two signals.

In each of FIGS. 3 and 4, the inbound LVDS data signals received at the serial connector 64 are fed to a differential LVDS-PECL translation circuit 140. This circuit represents the receiver end of the inbound digital signal link 41b. It is conventional in nature and may be implemented, by way of example only, using a pair of MOTOROLA™ model 10EL16D ECL line receiver ICs and a resistive voltage divider network (see FIGS. 5 and 6) to amplify and level shift the LVDS input signals to PECL levels. The PECL level output of the LVDS-PECL translation circuit 140 is fed to a surface acoustic wave clock recovery module 150, which may be implemented, by way of example only, using a VECTRON™ model TRU600 circuit. The clock recovery module 150 recovers the 622 MHz clock from the serial data stream and provides it to the Mux/Demux circuit 70.

More specifically, the clock and data signals are a.c. coupled to a serial-parallel (SP) conversion circuit 160. The clock signal is used by the serial side of the SP conversion circuit 160 to latch the data signals. The clock signal is also divided by eight and used to drive the parallel side of the SP conversion circuit 160. Framing of the parallel data signals is provided by a frame detector circuit 162. This circuit observes the parallel data signal stream and periodically provides a positive framing pulse having a duration of one byte clock interval. At the end of each framing pulse, the parallel data signals output from the SP conversion circuit 160 are byte aligned with respect to the data frame boundary.

Figure 5A:
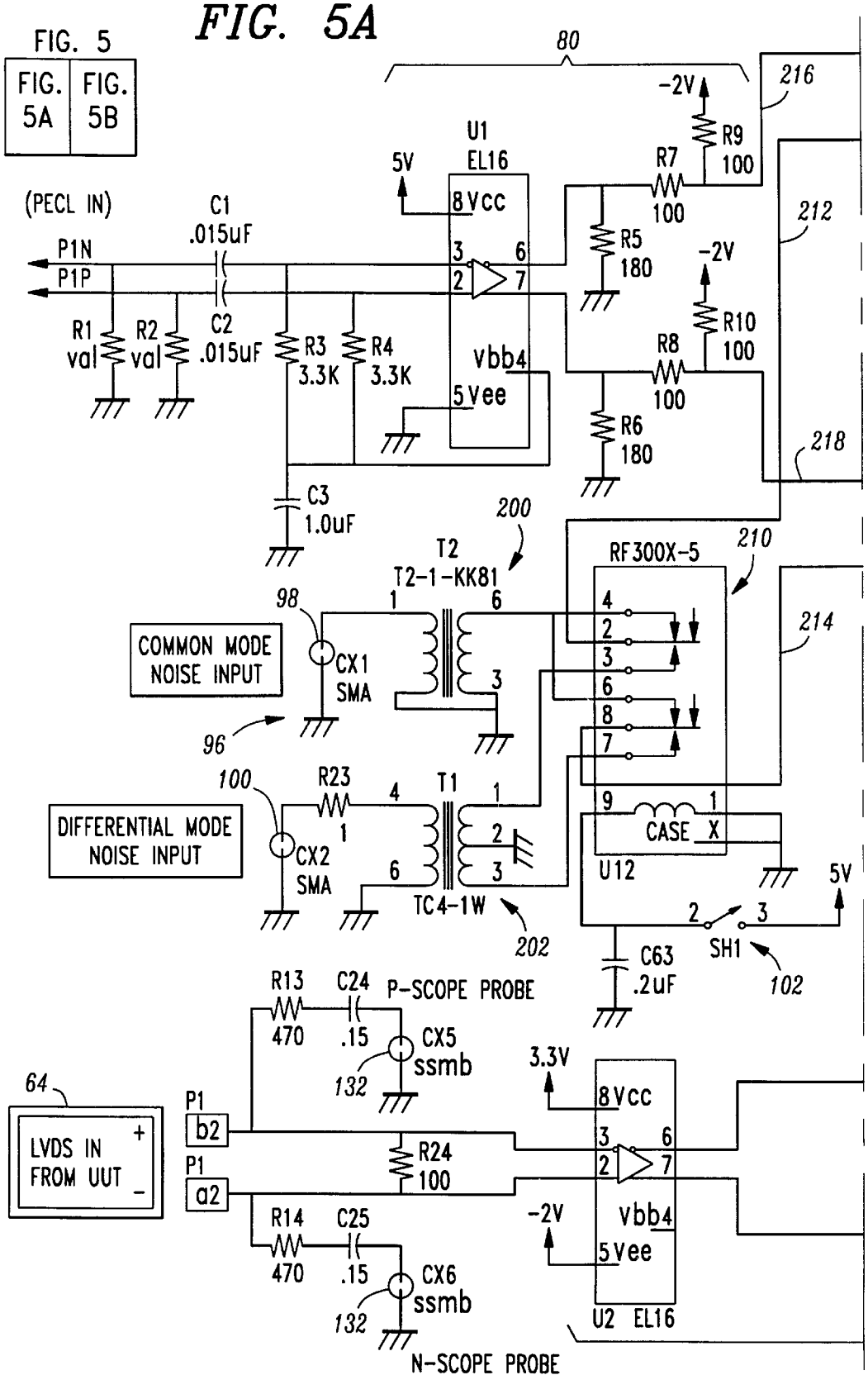
FIG. 5 is schematic diagram showing construction details of the test board of FIG. 3, including the directional couplers and phase splitting components of the TISI network of FIG. 3.
Figure 5B:
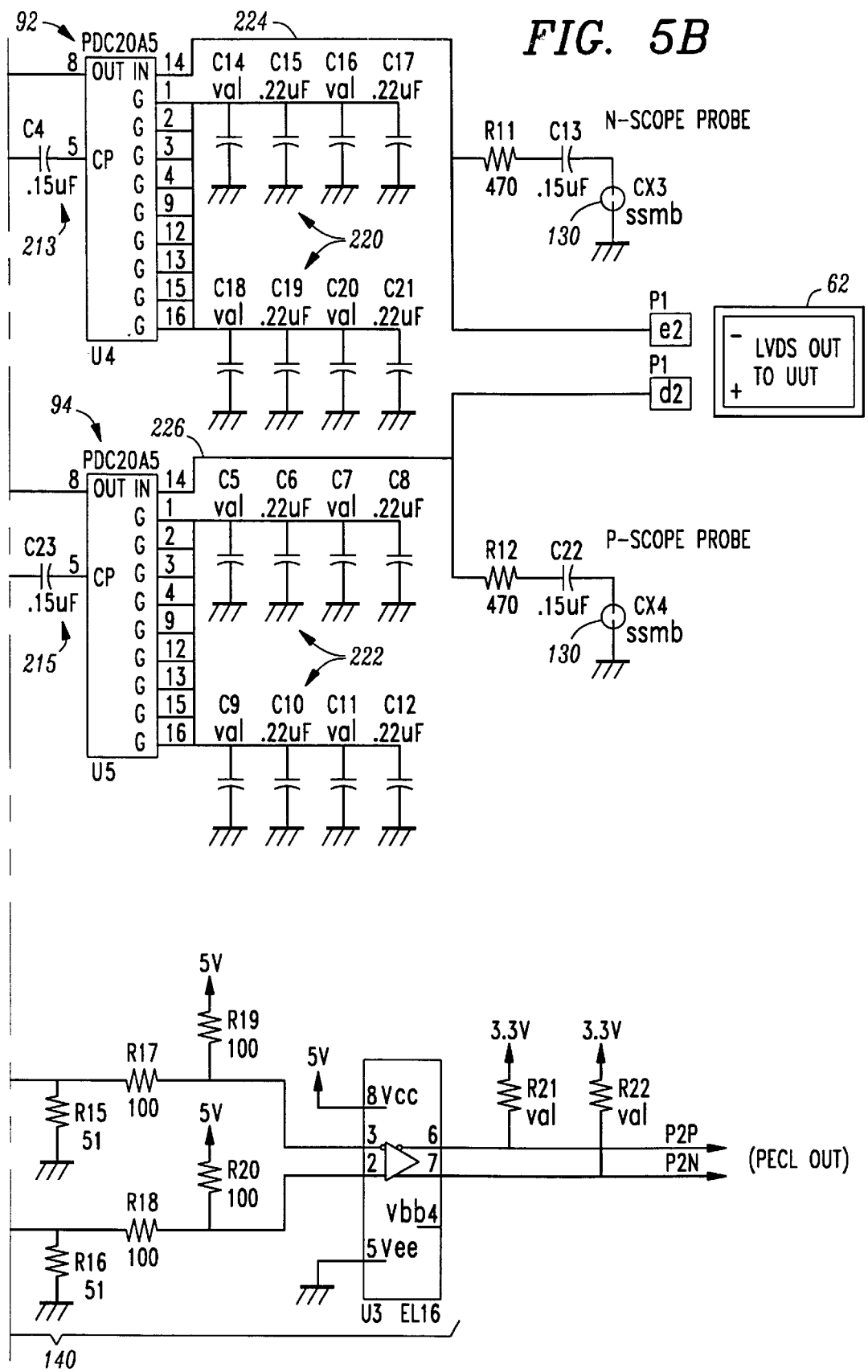
Figure 6B:
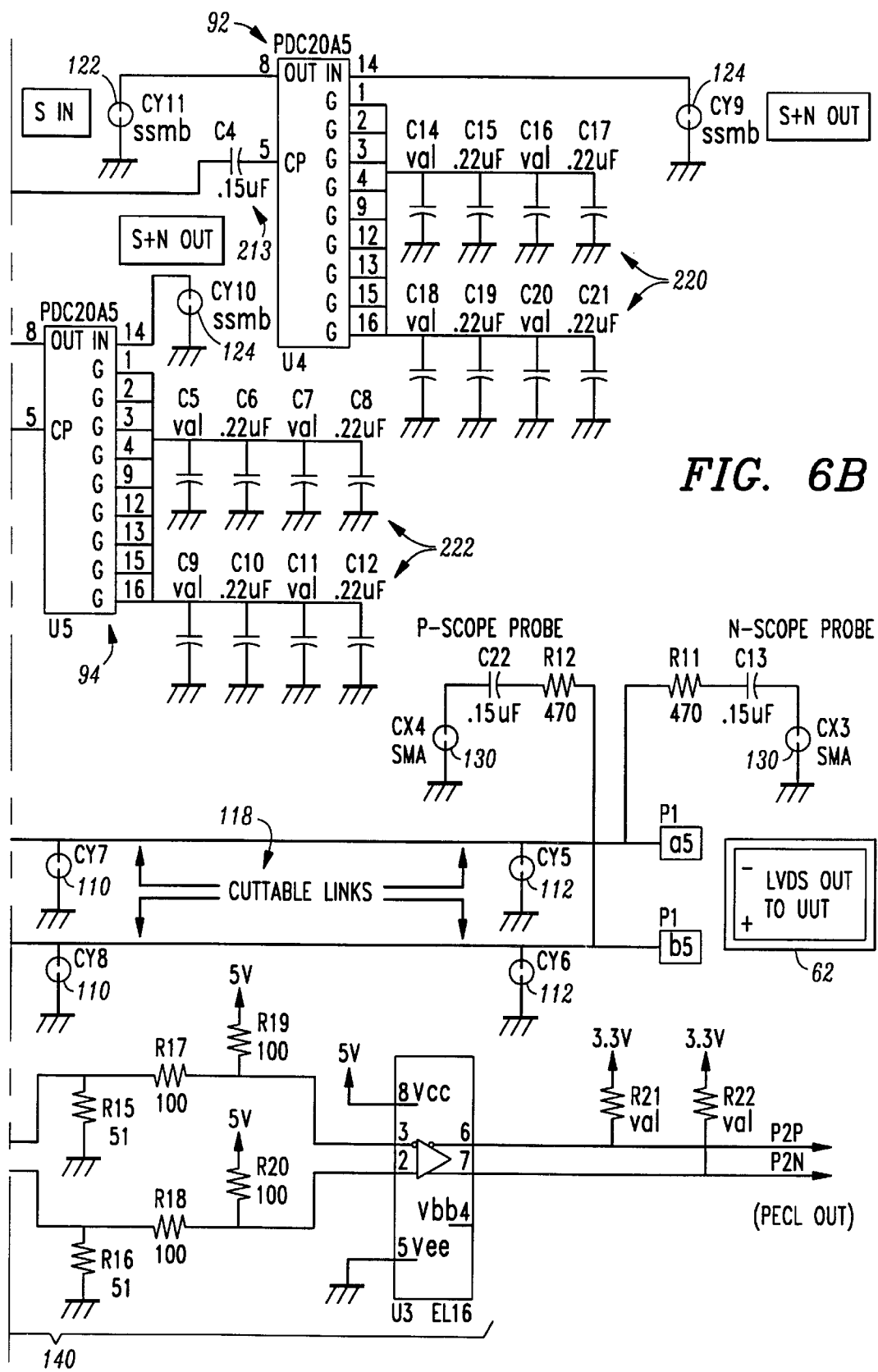
FIG. 6 is schematic diagram showing construction details of the test board of FIG. 4, including the directional couplers and phase splitting components of the TISI network of FIG. 4.

Turning now to FIGS. 5 and 6, the components of the TISI network 90 are shown in more detail. As stated, the same components could be used to implement the TISI network 4 of FIG. 1. FIG. 5 corresponds to FIG. 3 and the construction wherein the TISI network 90 is connected to the outbound digital signal link 41a. FIG. 6 corresponds to FIG. 4 and the construction wherein the TISI network 90 may be connected to either the outbound digital signal link 41a or the inbound digital signal link 41b.

In FIG. 5, the phase splitter circuit 96 is shown as including a pair of wide band impedance matching transformers 200 and 202. The transformer 200 receives interference signals from the common mode interference signal input port 98 and the transformer 202 receives interference signals from the differential mode interference signal input port 100. Both of the transformers 200 and 202 match the impedance of the incoming interference signals to the characteristic impedance of the remainder of the TISI network 90 (e.g., 25 ohms for the single output of the common-mode transformer 200 and 50 ohms for each of the twin outputs of the differential mode transformer 202).

As can be seen in FIG. 5, the transformer 200 has a positive end terminal and a grounded end terminal. It functions as a non-phase splitting transformer. The transformer 202 has positive and negative end terminals and a grounded center tap terminal. It functions as a phase splitting transformer. The non-phase splitting transformer 200 couples common mode interference signals into the TISI network 90 and the phase splitting transformer 202 couples differential mode interference signals into the TISI network 90. These interference signals are fed to a radio frequency (RF) relay 210 that is controllably activated by the mode selection toggle switch 102. When the toggle switch 102 is open, as shown in FIG. 5, a pair of same-phase, common mode interference signals are passed by the relay 210 and differential mode interference signals are blocked. When the toggle switch 102 is closed, a pair of opposite-phase, differential mode interference signals are passed by the relay 210 and common mode interference signals are blocked. The interference signals output from the relay 210 are carried on two lines 212 and 214, respectively. Each interference signal carried on the lines 212 and 214 is fed through a respective series capacitor 213 and 215 to respective ones of the directional couplers 92 and 94.

The directional couplers 92 and 94 are preferably constructed from microwave transformers operating as mid-band devices with several decades of bandwidth, for example, about 300 MHz. In FIG. 5, the LVDS data signals carried on the outbound digital signal link 41a are respectively provided to the directional couplers 92 and 94 over lines 216 and 218 from the PECL-LVDS translation circuit 80. The line 216 carries the positive component of the LVDS data signals and the line 218 carries the negative component of the LVDS data signals. In FIG. 6, the LVDS data signals carried on either the outbound digital signal link 41a or the inbound digital signal link 41b are selectively provided to the directional couplers 92 and 94 via the input connector pair 122.

The directional couplers 92 and 94 couple the two same-phase common mode interference signals provided by the phase splitter circuit 96 onto the positive and negative side of the LVDS data signals, in equal proportions. Each opposite-phase differential mode interference signal is coupled so that the positive side of the LVDS data signal receives one phase and the negative side of the LVDS data signal receives the other phase. All interference signals are coupled at a controlled impedance that matches the impedance of the outbound digital signal link 41a (e.g., 50 ohms). In FIG. 5, lines 224 and 226 carry the LVDS data signals out of the directional couplers 92 and 94 and direct them to the serial connector 62. The line 224 carries the positive component of the LVDS data signals and the line 226 carries the negative component of the LVDS data signals. In FIG. 6, the LVDS data signals are passed via the connector pair 124 to the serial connector 62.

Advantageously, the directional coupler ground terminals are connected to the test system ground plane through plural, parallel-connected capacitor arrays 220 and 222. Capacitors of different values can be provided to bypass multiple a.c. frequencies. The directional coupler ground pins are thus d.c. isolated from the system ground. This avoids shorting of the d.c. logic levels in the LVDS data signals by providing a floating node that acts as an a.c. ground. Additionally, the series capacitors 213 and 215 block the d.c. voltage component of the interference signals so that this component does not affect the LVDS d.c. voltage levels. The normal d.c. voltage levels in the LVDS serial data signal are thus able to pass through the directional couplers 92 and 94 to the serial data signal output port 62.

Figure 7:
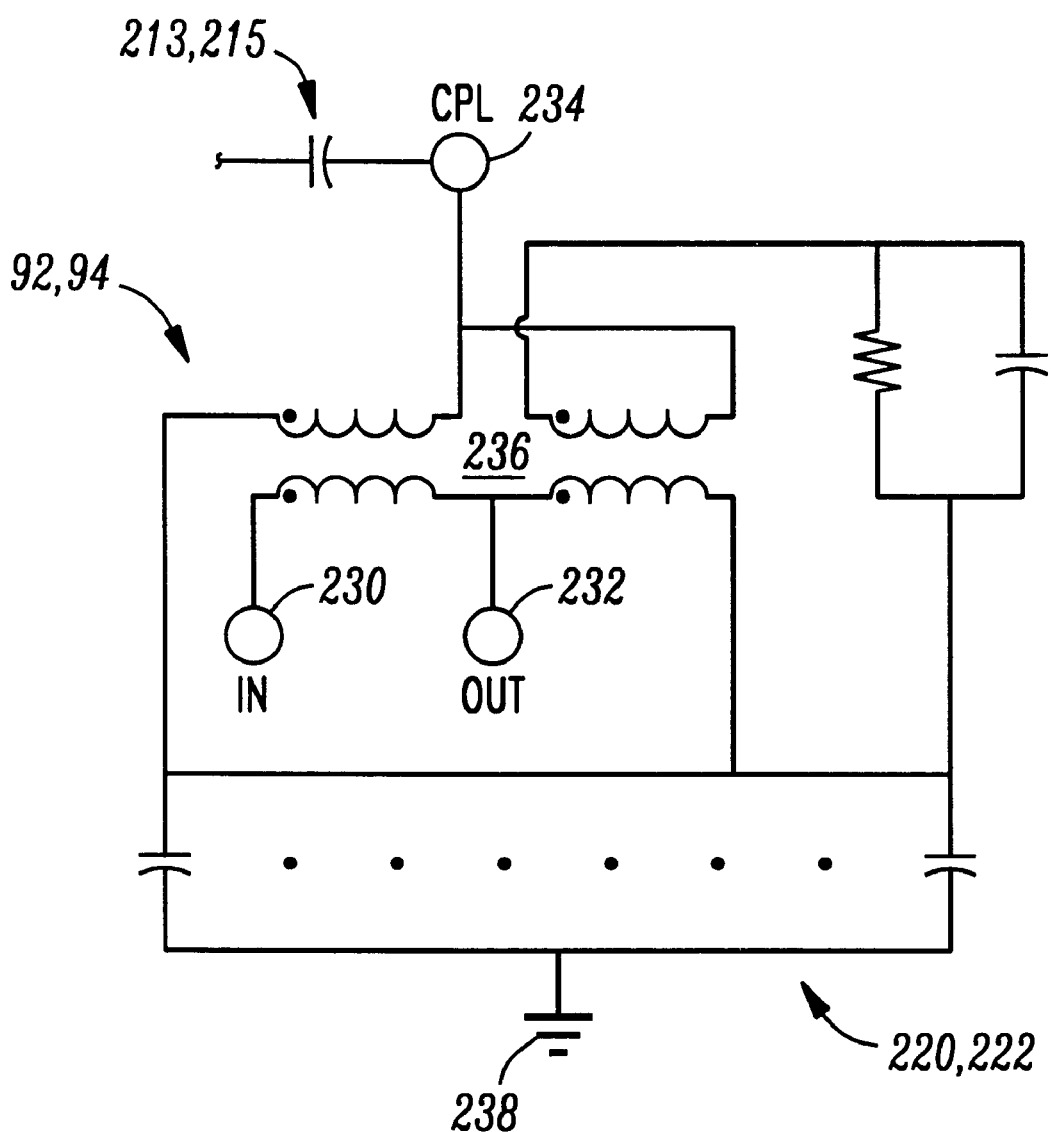
FIG. 7 is a schematic diagram showing the internal configuration of the directional couplers of FIGS. 5 and 6.

FIG. 7 provides further illustration. As shown therein, each directional coupler 92, 94 includes a data signal input port 230, a data signal output port 232 and an interference injection signal input port 234. Each port is connected to the windings of a transformer 236. The transformer ground terminals are isolated from the test system ground 238 by connecting them to the parallel-connected capacitor array 220/222. The series capacitors 213/215 block the d.c. voltage level of the interference signals and isolate this signal component from the data signal input port 230. This allows the d.c. component of the input LVDS signal component to control the d.c. voltage level of the coupler transformer windings, insofar as they are all tied together via the coupler internal ground connections. A further advantage of using the multiple parallel-connected capacitor arrays 220/222 is that they provide short, low impedance paths from the coupler ground pins to the system ground plane, which is desirable in high frequency digital circuits.

Figure 8A:
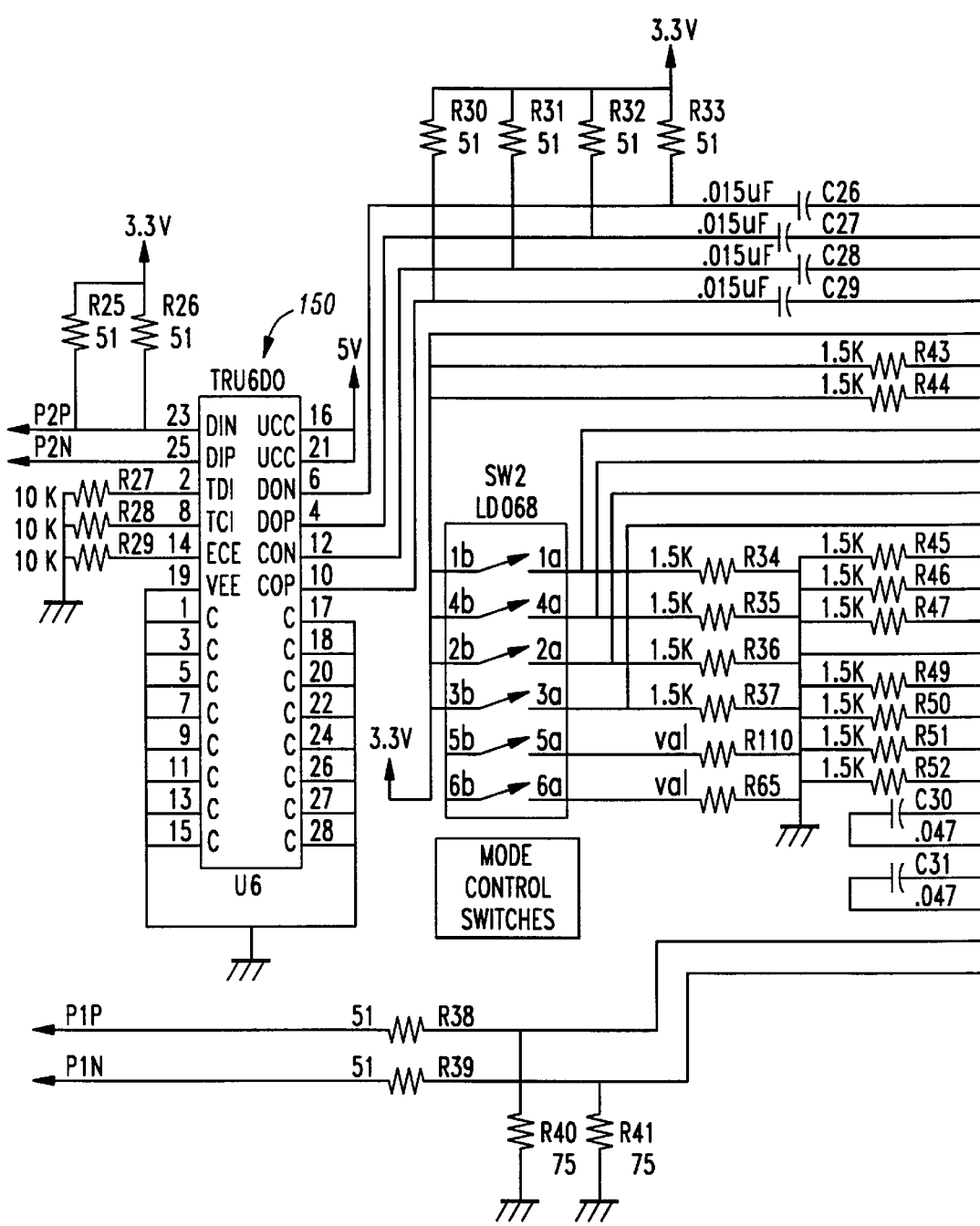
FIG. 8 is a schematic diagram showing details of the multiplexer/demultiplexer and clock recovery circuits of the test boards of FIGS. 3 and 4.
Figure 8B:
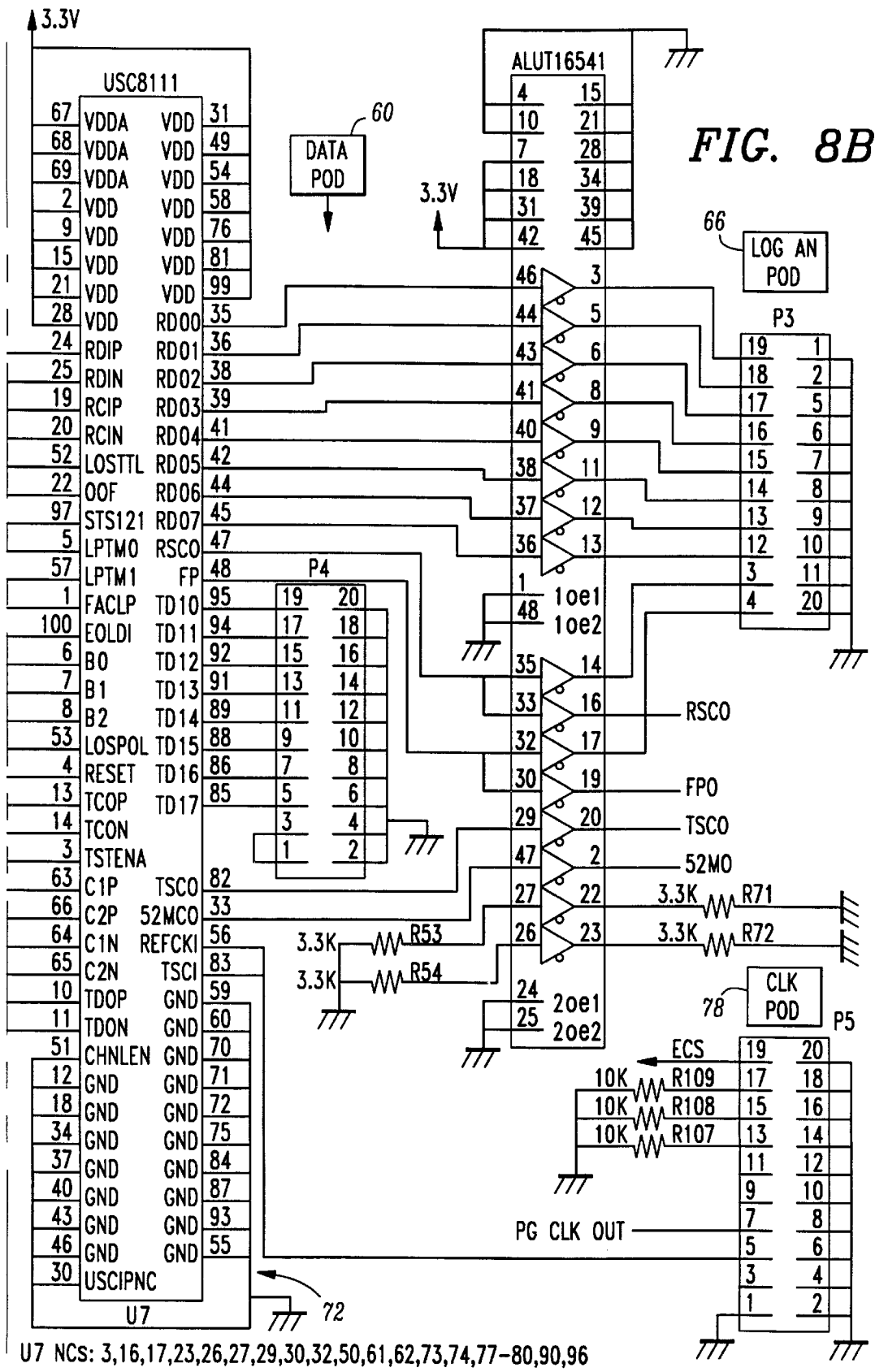

Turning now to FIG. 8, the details of the mux/demux circuit 70 and the clock recovery circuit 150, and their connections, are illustrated. There are several connections of interest relative to the present invention.

On the data signal transmit side, pins 95, 94, 92, 91, 89, 88, 86 and 85 of the Mux/Demux circuit 70 represent the parallel data signal inputs [0:7] to the PS conversion circuit 72, which are provided from the parallel connector 60. Pins 56 and 83 of the Mux/Demux circuit 72 represent the clock signal inputs to the PS conversion circuit 72 and the PLL clock multiply circuit 74, respectively, provided from the pattern generator clock input port 78. Pins 10 and 11 of the Mux/Demux circuit 70 represent the positive and negative serial data signal outputs, respectively, from the PS conversion circuit 72 that are fed to the PECL-LVDS translation circuit 80 for transmittal to the UUT 50.

On the data signal receive side, pins 23 and 25 of the clock recovery circuit 150 represent the positive and negative serial data signal inputs, respectively, from the LVDS-PECL translation circuit 140 following its receipt of the LVDS data signals from the UUT 50. Pins 6 and 4 of the clock recovery circuit 150 represent the positive and negative serial data signal outputs, respectively, from the clock recovery circuit 150.

These signals are fed to pins 24 and 25 of the Mux/Demux circuit 70, which represent the positive and negative serial data signal inputs, respectively, to the SP conversion circuit 160. Pins 12 and 10 of the clock recovery circuit 150 represent the clock signals recovered from the positive and negative serial data signals, respectively. These signals are fed to pins 19 and 20 of the Mux/Demux circuit 70, which represent the positive and negative clock signal inputs to the SP conversion circuit 160. Pins 35, 36, 38, 39, 41, 42, 44, and 45 of the Mux/Demux circuit 70 represent the parallel data signal outputs [0:7] provided from the SP conversion circuit 160 to the parallel connector 66. Pins 47 and 48 of the Mux/Demux circuit 70 represent the clock signal outputs provided from the SP conversion circuit 160 and the frame detector circuit 162, respectively, to the parallel connector 66.

Figure 9B:
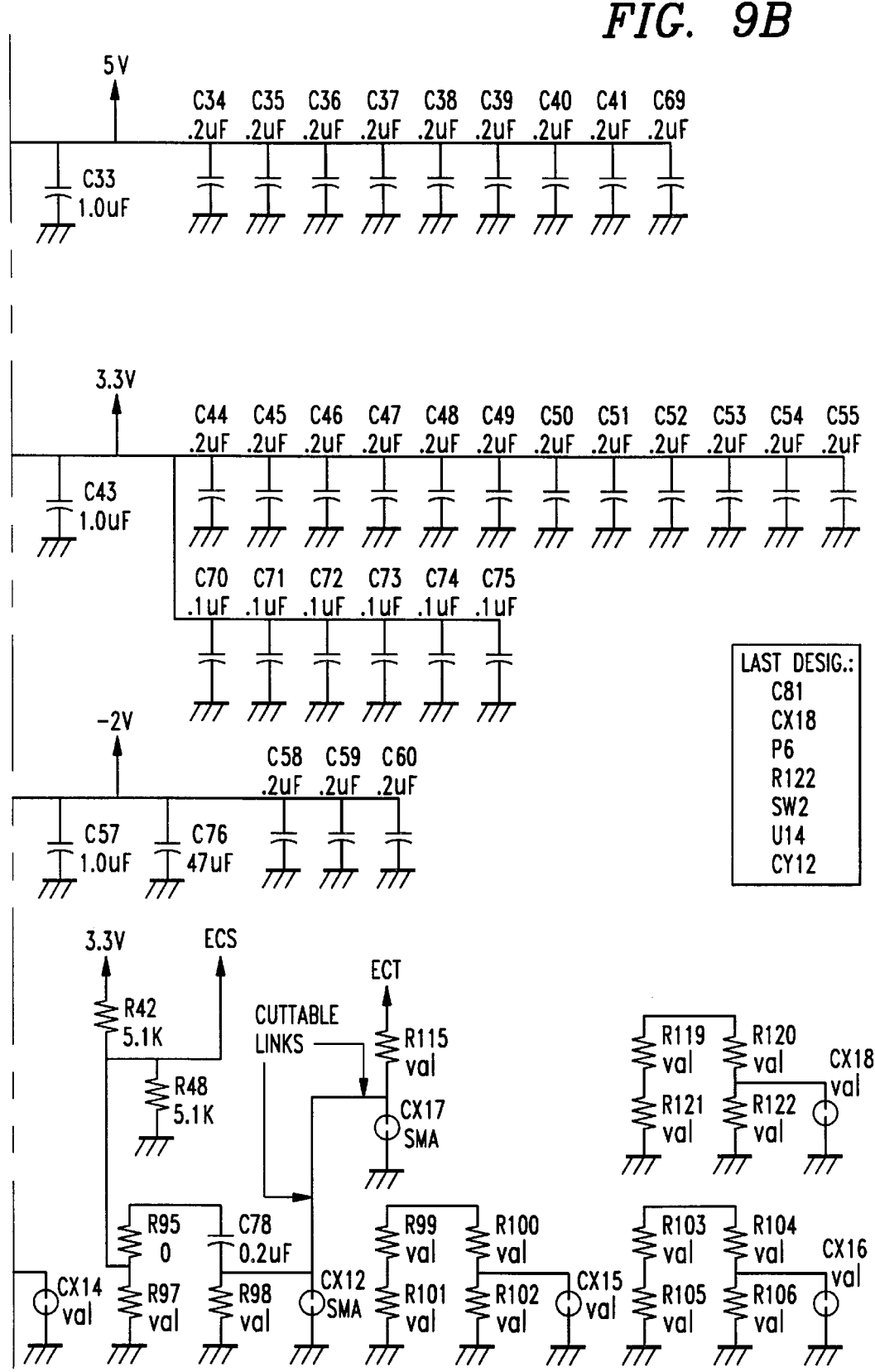
FIG. 9 is a schematic diagram showing details of the power supply components of the test boards of FIGS. 3 and 4.

FIG. 9 shows a preferred power supply for use with the test board 42, and illustrates the various reference voltages produced thereby.

The foregoing test system of FIGS. 2 et seq. provides substantial protocol flexibility. A variety of interference data may be generated by the PC 44. These data are transmitted to the pattern generator 46, which buffers the data and outputs the 78 Mbps data stream that is applied to the test board 42. The UUT 50 operates in a loopback mode during interference testing. The test signals provided via the outbound digital signal link 41a to the receiver end 57 of the UUT 50 are passed to the driver end 58 of the UUT 50 and returned via the inbound digital signal link 41b. This allows the outbound and inbound digital signal links 41a and 41b to be characterized as a step in determining the operating characteristics of the UUT 50 in a digital signalling system. The data set returned from the UUT 50 can be forwarded to the PC 44 for analysis or monitored via the monitoring ports 130 and 132. The TISI network 90 provides a system for injecting controlled level interference signals into the digital signal link 41 during all phases of interference testing. In the test system configuration of FIG. 3, interference and noise tolerance measurements can be made as the TISI network 90 inserts data +interference signals into the outbound digital signal link 41a. In the test system configuration of FIG. 4, additional test measurements can be made as the TISI inserts data +interference signals into the inbound digital signal link 41b. As an additional advantage, once interference characterization is complete, the UUT 50 can be taken out of loopback mode to allow full functional testing and programming using the PC 44.

Accordingly, various test systems for characterizing digital circuit interference and noise tolerance have been described. While specific embodiments have been disclosed, it should be apparent that many variations and alternative embodiments could be implemented without departing from the scope of the invention. It is understood, therefore, that the invention is not to be in any way limited except in accordance with the spirit of the appended claims and their equivalents.

What is claimed is:

1. A test system for characterizing interference tolerance in a digital signal link, comprising:
    a digital data signal generator;
    a digital data signal receiver;
    a digital signal link connected between said data signal generator and said data signal receiver and carrying digital data signals generated by said data signal generator to said data signal receiver;
    a test interference signal injection (TISI) network disposed in said digital signal link;
    a data signal input to said TISI network for receiving said digital data signals from said digital signal link;
    a data signal output from said TISI network for returning said digital data signals to said digital signal link;
    an interference signal input to said TISI network for receiving interference signals from an interference signal generator; and
    directional coupling means in said TISI network for directionally coupling said interference signals into said digital signal link at an impedance that substantially matches the impedance of said digital signal link, said directional coupling means being configured to maintain d.c. isolation from ground to facilitate the transfer of d.c. coupled logic in said digital data signals through said TISI network.

2. A test system in accordance with claim 1 wherein said directional coupling means includes one or more broadband directional coupling transformers.

3. A test system in accordance with claim 2 wherein the ground connections of said directional coupling transformers are connected to a plurality of parallel bypass capacitors to provide a floating node that acts as an a.c. ground, and which allows said d.c. coupled logic in said digital data signals to pass through said directional coupling transformers to said data signal output.

4. A test system in accordance with claim 3 further including a series capacitor disposed between said interference signal input and each of said directional coupling transformers for blocking d.c. voltage levels in said interference signals.

5. A test system in accordance with claim 2 wherein there are two of said directional coupling transformers adapted for coupling common mode interference signals and differential mode interference signals into said digital signal link.

6. A test system in accordance with claim 5 further including phase splitter means for receiving said interference signals from said interference signal input port and selectively providing said interference signals to said directional couplers as a pair of same-phase common mode interference signals or a pair of opposite-phase differential mode interference signals.

7. A test system in accordance with claim 6 wherein said phase splitter means includes a pair of impedance matching transformers, including a non-phase splitting grounded end terminal transformer for producing said pair of said same-phase common mode interference signals and a phase splitting, grounded center-tapped transformer for producing said pair of opposite-phase differential mode interference signals.

8. A test system in accordance with claim 7 wherein said phase splitter means further includes a switch-activated radio frequency relay for selectively routing said common mode interference signals and said differential mode interference signals from said impedance matching transformers to said directional coupling transformers.

9. A test system in accordance with claim 1 further including one or more monitoring ports for connecting signal monitoring equipment to one or more locations on said digital signal link for monitoring said digital data signals carried thereon.

10. A test system for characterizing interference tolerance in a pair of first and second high speed digital signal links connected to a unit under test (UUT) and adapted for carrying either common mode serial data signals or differential mode serial data signals, said test system comprising:

a data signal generating and analysis suite containing a data signal generator and a data signal receiver;

a test board mounting a driver end of said first digital signal link and a receiver end of said second digital signal link;

a UUT having a receiver end circuit and a driver end circuit, and being capable of operating in a loopback mode wherein digital signals received at said receiver end circuit are directed to said driver end circuit while bypassing other signal processing components of said UUT;

a first link segment cable forming part of said first digital signal link and extending from said test board to said UUT receiver end circuit;

a second link segment cable forming part of said second digital signal link and extending from said UUT driver end circuit to said test board;

said data signal generator being connected to provide digital data signals to said driver end of said first digital signal link;

said data signal receiver being connected to receive digital data signals from said receiver end of said second digital signal link;

a test interference signal injection (TISI) network mounted on said test board and connected as part of either said first digital signal link or said second digital signal link;

a serial data signal input port in said TISI network for receiving said high speed serial data signals generated by said data signal generator;

a serial data signal output port in said TISI network for providing said high speed serial data signals to said digital data signal receiver;

a controlled impedance, high speed serial data path in said TISI network carrying said high speed serial data signals from said data signal input port to said data signal output port;

an interference signal input port in said TISI network for receiving interference signals from an interference signal generator;

a phase splitter in said TISI network adapted to receive said interference signals from said interference signal port and to selectively provide common mode interference signals or differential mode interference signals; and a pair of directional couplers in said TISI network adapted to selectively couple said common mode interference signals or said differential mode interference signals into said high speed serial data path, the ground connections of said directional couplers being connected to a floating node providing an a.c.- bypassing/d.c.- isolated ground that allows normal d.c. voltage levels of said high speed serial data signals to pass through said directional couplers to either said data signal output port or said data signal input port.

11. A test system in accordance with claim 10 wherein said TISI network is connected in said first digital signal link between said first digital signal link driver end and said first link segment cable.

12. A test system in accordance with claim 10 wherein said TISI network is configured for selectable connection in either said first digital signal link between said first digital signal link driver end and said first link segment cable or said second digital signal link between said second link segment cable and said second digital signal link receiver end.

13. A test system in accordance with claim 10 wherein said data signal generator includes a pattern generator circuit, a pattern generator clock circuit and a logic analyzer circuit.

14. A test system in accordance with claim 13 wherein said pattern generator and logic analyzer circuits respectively transmit and receive parallel, positive emitter coupled logic (PECL) signals to and from said test board, wherein said digital signal links carry serial, low voltage differential signals (LVDS) to and from said UUT, and wherein said test board further includes serial-to-parallel and parallel-to-serial signal conversion circuits and PECL-to-LVDS and LVDS-to-PECL signal translation circuits, for transitioning between said parallel PECL signals carried by said pattern generator and logic analyzer circuits and said serial LVDS signals carried by said digital signal links.

15. A test system in accordance with claim 14 further including a clock recovery circuit for deriving clock signals from said serial LVDS signals received at said second digital signal link receiver end.

16. A test system in accordance with claim 15 further including a frame detector circuit for framing said parallel PECL signals prior to passing said signals to said logic analyzer circuit.

17. A test system in accordance with claim 16 wherein said directional couplers comprise broadband directional coupling transformers, and wherein said transformer ground pins are connected through an array of bypass capacitors to the test system ground to provide said a.c.- bypassing/d.c.-isolated ground.

18. A test system in accordance with claim 17 wherein said bypass capacitor array includes a plurality of parallel-connected capacitors of different values for bypassing different a.c. frequencies to ground.

19. A test system in accordance with claim 18 wherein said directional couplers are adapted to couple said interference signals into said data signal path over a bandwidth of at least about 300 MHz.

20. A test system for characterizing interference tolerance in a digital signal link, comprising:

- a digital data signal generator for generating high speed serial data signals;
- a digital data signal receiver for receiving said high speed serial data signals;
- a digital signal link connected to carry said serial data signals generated by said data signal generator to said data signal receiver;
- a test interference signal injection (TISI) network connected as part of said digital signal link;
- a data signal input port in said TISI network for receiving said high speed serial data signals generated by said data signal generator;
- a data signal output port in said TISI network for providing said high speed serial data signals to said data signal receiver;
- a controlled impedance data signal path in said TISI network carrying said high speed serial data signals between said data signal input port and said data signal output port;
- an interference signal input port in said TISI network for receiving interference signals over a range of frequencies from an interference signal generator;
- phase splitter means in said TISI network for receiving said interference signals and selectively providing common mode interference signals and differential mode interference signals for injection into said data signal path, said phase splitter means including a pair of impedance matching transformers, including a non-phase splitting grounded end terminal transformer for providing a pair of same-phase common mode interference signals and a phase splitting grounded center-tap terminal transformer for providing a pair of opposite-phase differential mode interference signals, said phase splitter means further including a switch-activated radio frequency relay for selecting between said common mode interference signals and said differential mode interference signals;
- directional coupling means in said TISI network for receiving said interference signals from said phase splitter means and including two broadband directional coupling transformers for selectively coupling said common mode interference signals or said differential mode interference signals into said data signal path, said interference signals being coupled toward either said data signal output port or said data signal input port at an impedance that substantially matches the impedance of said digital signal link, said directional coupling means being configured to maintain d.c. isolation from ground by connecting the ground pins of said directional coupling transformers to a plurality of parallel bypass capacitors to provide a floating node that acts as an a.c. ground and which allows d.c. voltage levels in said high speed serial data signals to pass through said test interference signal injection network; and
- one or more monitoring ports in said digital signal link for connecting signal monitoring equipment thereto in order to monitor said high speed serial data signals carried thereon.

* * * * *